United States Patent

[11] 3,631,906

[72] Inventor: Erik Torsten Forslund, Alfta, Sweden
[21] Appl. No.: 19,689
[22] Filed: Mar. 16, 1970
[45] Patented: Jan. 4, 1972
[73] Assignee: Ostbergs Fabriks AB
[32] Priority: Mar. 18, 1969
[33] Sweden
[31] 3712/69

[54] CUTTING BLADE FOR CUTTING TREE TRUNKS
5 Claims, 2 Drawing Figs.

[52] U.S. Cl. .................................................. 144/34 F, 143/133 F
[51] Int. Cl. .................................................. A01g 23/02
[50] Field of Search .................................. 143/133 R, 133 F; 144/34 R, 34 A, 34 B, 34 C, 34 D, 34 E, 34 F

[56] References Cited
UNITED STATES PATENTS

| 87,891 | 3/1869 | Weible et al. | 143/133 R |
| 234,062 | 11/1880 | Proctor | 144/34 F |
| 238,521 | 3/1881 | Osgood | 143/133 R |
| 245,588 | 8/1881 | Bibber | 143/133 R |
| 452,391 | 5/1891 | Rothgery | 143/133 R |
| 940,518 | 11/1909 | Dunn et al. | 143/133 F |
| 1,566,880 | 12/1925 | Kelley | 143/133 F |

Primary Examiner—Gerald A. Dost
Attorney—Pierce, Scheffler & Parker

ABSTRACT: Cutting blade for cutting trees by forcing the blade against the tree, according to which the forward edge of the blade is provided with key grooves of alternatingly opposed inclination forming straight and perpendicularly shearing partial edges extending in the direction of the forward edge of the blade and staggered relative to the central plane of the cutting blade.

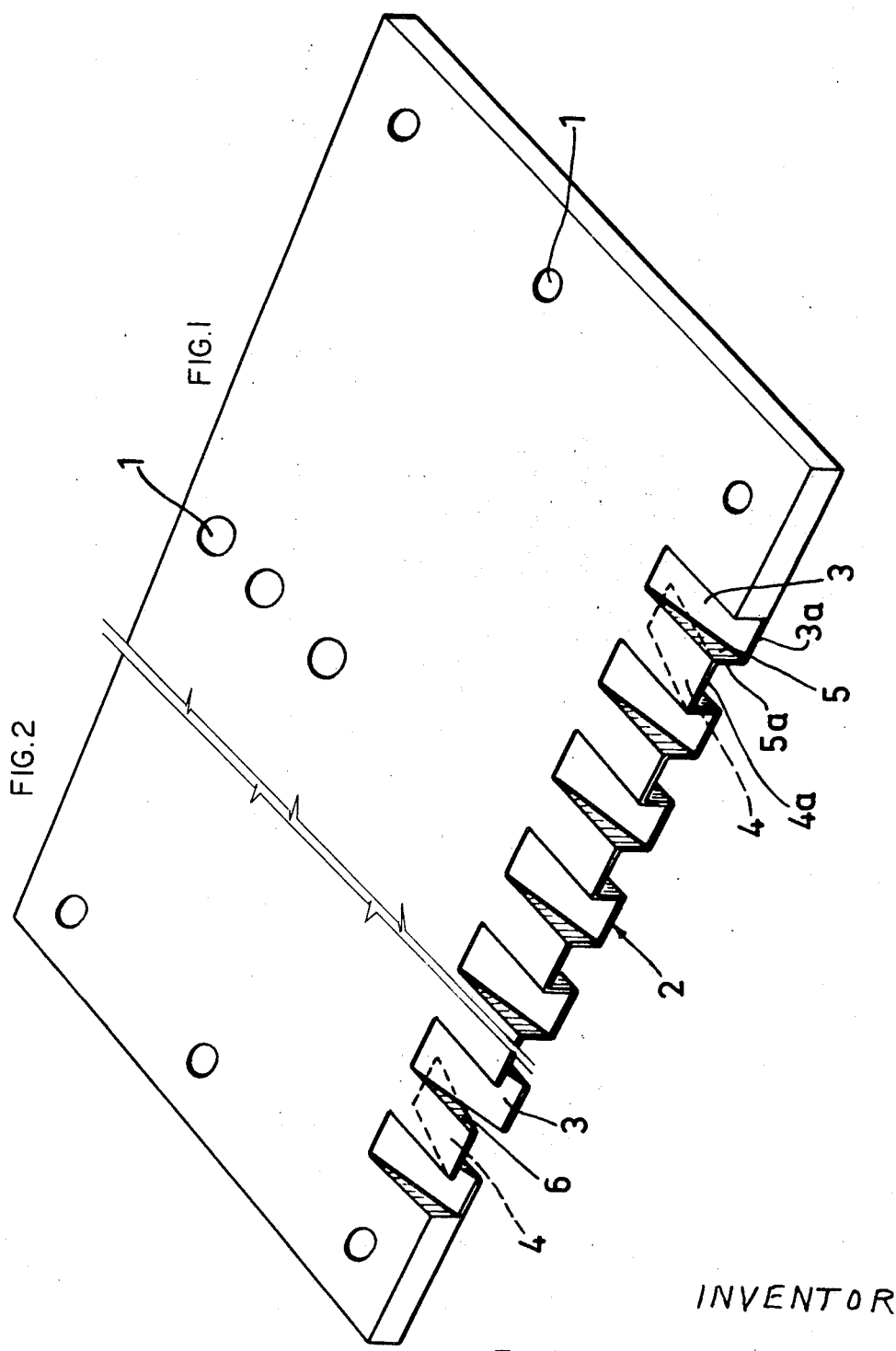

CUTTING BLADE FOR CUTTING TREE TRUNKS

This invention relates to a cutting blade for the cutting of trees.

In many cases, particularly when cutting frozen trees, the cutting blade with its edge chamfered in the usual way shows marked tendency of being guided, inclined or warped, which results in corresponding inclined cuts.

The cutting blade according to the invention effects substantially plane cuts, owing to the fact, that in the forward edge of the blade key grooves of alternatingly opposed inclination are provided so as to form partial edges staggered relative to the central plane of the cutting blade.

The invention is described in greater detail in the following, with reference to the accompanying drawing, in which:

FIG. 1 shows a perspective view of a cutting blade, designed in accordance with a first embodiment of the invention, and FIG. 2 is a similar perspective view illustrating a second embodiment of the invention. The first embodiment will be described first.

The cutting blade comprises a rectangular plane parallel steel plate with schematically indicated holes 1 for mounting the blade on its drive mechanism. The edge portion of the blade, having the general designation 2, is formed by milling key grooves 3 along the edge 2 with spacings exceeding somewhat the key width, and by milling similar key grooves 4 from the other plane surface of the blade, which latter key grooves are located between the first-mentioned key grooves. The inclined lateral edges of the grooves 4 are concealed in the figure, but for the groove 4 farthest to the right they are indicated by dashed lines. The grooves 3 and 4 terminate near the respective opposite plane surface of the blade so as to form at the blade edge partial edges 3a and 4a, respectively, which may have an inclination of, for example, 15°. The walls separating the grooves and tapering to wedge-shape in the cutting direction of the blade are designated by 5. All of the partial edges 3a and 4a along the edge portion 2 form together with the forward edges 5a of the walls 5 a coherent crenelated-edge outline, seen from the forward edge of the blade.

Said outline implies a strong stiffening of the blade-edge compared with the usual straightline edge, which because of its relative weakness easily tends to be bent or warped. This tendency when it is well established is supported progressively by the increasingly eccentric load on the edge. Even when said stiffening of the blade edge obtained by the arrangement according to the invention is left out of account, said tendency to be loaded eccentrically obviously is counteracted by the alternatingly opposite inclination of the key grooves 3 and 4.

The second embodiment shown in FIG. 2 is manufactured in a way analogous to the first embodiment, but the key grooves are milled so close one to the other, or with such a width, that no partition walls between the key grooves are formed, but that the grooves 3 and 4 instead have common sidewalls 6. The effect is similar to that achieved with the first embodiment.

The invention is not restricted to the embodiments shown, but different modifications thereof can be imagined. The blade edge, for example, instead of the end outlines shown may be given another shape, for example sawtooth or waveshape. A stiffening and guiding effect would be obtained also by replacing the guide cams defined by the vertical surfaces of said configurations with parallel guide flanges on one or both sides of a conventionally chamfered blade-edge, which guide flanges extend in the working direction of the cutting blade.

What I claim is:

1. A cutting blade for cutting trees by forcing the blade against the tree, in which the straight forward edge of the blade is provided with key grooves of alternatingly opposed inclination forming straight and perpendicularly shearing partial edges extending in the direction of said forward edge and alternately positioned on different levels.

2. Cutting blade according to claim 1, characterized in that said key grooves have equal width and are uniformly distributed along the entire operative length of the forward edge of the blade.

3. Cutting blade according to claim 1, characterized in that the bottom of the key grooves forms an angle of approximately 15° with the plane of the cutting blade.

4. A cutting blade as defined in claim 1, wherein the blade is a plate and said partial edges are located in the respective parallel outer surfaces of said plate.

5. A cutting blade as defined in claim 4, wherein the key grooves in the respective parallel outer surfaces of the plate are directly adjacent one to the other to form a discontinuous edge line.

* * * * *